United States Patent Office 3,842,027
Patented Oct. 15, 1974

3,842,027
VINYL CHLORIDE POLYMER POWDERS
Stanley Hamilton Richardson, Millington, N.J., assignor to Union Carbide Corporation, New York, N.Y.
No Drawing. Filed June 26, 1973, Ser. No. 373,842
Int. Cl. C08f 15/30, 45/38
U.S. Cl. 260—31.8 R
4 Claims

ABSTRACT OF THE DISCLOSURE

Free flowing powders of from 75 to 82 parts by weight of a vinyl chloride/vinyl acetate/maleic acid polymer with from 18 to 25 parts by weight of ditridecyl phthalate, or triisodecyl trimellitate are produced that have good adhesion to the coated substrate.

Within the past few years the emphasis in the paint industry has been the development of coating compositions that would not evolve components that pollute the atmosphere. This has resulted in the currently used water based coatings, 100 percent reactive solvents coating compositions, and, most recently, the drive to develop powder coating compositions.

The powder coatings are the most desirable from a pollution point of view as they are essentially free of volatile solvents. They are applied by fluid bed techniques or electrostatic spray techniques in a solid form to the substrate and then fused to a substantially cohesive, uniform film. Among the most important properties required of a powder coating are those of free flow, good adhesion to the substrate, and good fusion without fuming; all of these should be present.

Many polymers have been used in the production of powders; however, not all are suitable for use in coatings due to deficiencies. Among those that have been used are the vinyl chloride polymers because of their generally good film forming properties. However, it has been observed that the powders tend to either cake on storage, or the finished coating thereof on the substrate does not have sufficiently good adhesion. The vinyl chloride polymer powder coatings are formulated compositions containing the conventional amounts of conventional plasticizers, pigments, stabilizers and other additives.

It has now been found that certain terpolymers of vinyl chloride, vinyl acetate and maleic acid when plasticized with a critical amount of either ditridecyl phthalate or triisodecyl trimellitate, or mixtures thereof, produce powders that are free flowing, and fuse well to produce good adherent coating films.

The terpolymers are those that contain from about 78 to 87 weight percent, preferably about 80 to 85 weight percent, of vinyl chloride; from about 11 to 19 weight percent, preferably about 14 to 18 weight percent, of vinyl acetate; and from about 0.1 to 3 weight percent, preferably about 1 to 2 weight percent, of maleic acid. Many such terpolymers are commercially available and illustrative thereof one can mention the 81/17/2, 83/16/1 and 84/15/1 vinyl chloride/vinyl acetate/maleic acid terpolymers. The polymers can also contain small amounts up to several percent of other monomers polymerized therein.

The blends of this invention contain from 75 to 82 parts of one or more of such terpolymers, preferably from 79 to 81 parts of terpolymer, and from 18 to 25 parts of the defined plasticizer, preferably from 19 to 21 parts thereof, per 100 parts of the combined weight of terpolymer and plasticizer. To this blend one can also add, in the conventional quantities well known to those skilled in the vinyl chloride polymers field, any of the additives generally used with vinyl chloride polymers. These include pigments or dyes (e.g. titanium dioxide, cadmium red, carbon black, phthalocyanine blue, toluidine red, iron oxide, calcium carbonate, barium sulfate), stabilizers (e.g. dibutyltin dilaurate, dioctyltin mercaptide, alkylated phenols and bisphenols, barium-cadmium salts, epoxy resins), dispersants, flow control additives (the 75/25 copolymer of 2-ethylhexyl acrylate and ethyl acrylate; the 77.5/22.5 copolymer of n-hexyl acrylate and isodecyl acrylate), crosslinkers (polyols, polycarboxylic acids, polyamines, hydroxylamines, and other active hydrogen compounds), fungicides, bactericides, and many other additives known to those skilled in the art as suitable.

The components can be blended together by known means, such as fusion, and the homogeneous blend pelleted and cryogenically ground using liquid nitrogen for cooling. These procedures are well known to those skilled in the art and do not require further description herein.

The specific plasticizer used and its concentration are critical elements of this invention. Thus, it was found that other plasticizers might produce a free flowing powder but the finished fused coating therefrom did not have good adhesion; or, satisfactory adhesion might be obtainable but the powder would cake on standing. This is seen from the results reported in the following table. The compositions tested contained 100 parts of an 84/15/1 vinyl chloride/vinyl acetate/maleic acid terpolymer, the plasticizers in the proportion indicated, 65 parts of titanium dioxide pigment, 5 parts of the bis-glycidyl ether of bisphenol-A and 2 parts of an organic tin stabilizer Thermolite T–31 (registered trademark of M & T Chemicals). The adhesion of the films to the substrate was determined using the Gardner Impact Tester. The powders were applied using a conventional electrostatic spray coating unit and were baked for 5 minutes at 400° F. A satisfactory film should have a Gardner reverse impact rating of more than 80 inch pounds and the powder producing such a film should not cake on storage.

| Plasticizer | Proportion of vinyl polymer to plasticizer | Caking | Reverse impact, in.-lb. |
|---|---|---|---|
| Dibutyl phthalate | 80:20 | Cakes | 10 |
| Dioctyl phthalate | 80:20 | do | <40 |
| Diisodecyl phthalate | 90:10 | Flows | <5 |
|  | 85:15 | Cakes | <5 |
|  | 80:20 | do | >80 |
| Dicyclohexyl phthalate | 80:20 | Flows | <5 |
| Diphenyl phthalate | 80:20 | do | <5 |
| 2-ethylhexyl trimellitate | 80:20 | Cakes | >80 |
| Glyceryl tribenzoate | 75:25 | Flows | <10 |
| Blend of glyceryl tribenzoate (2), diisodecyl phthalate (1) | 80:20 | Cakes | <20 |
| Blend of polycaprolactone (2), diisodecyl phthalate (3) | 75:25 | do | >80 |
| Epoxidized soya oil | 80:20 | do | <20 |
| Diisodecyl adipate | 85:15 | do | >80 |
|  | 80:20 | do | >80 |
| Tricresyl phosphate | 90:10 | Flows | >20 |
|  | 85:15 | do | ~20 |
|  | 80:20 | Cakes | <10 |
| Tributoxy ethyl phosphate | 90:10 | Flows | <20 |
|  | 85:15 | Cakes | <20 |
|  | 80:20 | (*) |  |
| Tri(2-ethylhexyl)phosphate | 80:20 | Cakes | >80 |

*Caked so quickly that it could not be tested.

The data obtained shows that the conventional plasticizers produced powder coating compositions that either caked on storage or produced film coatings that had poor impact properties. However, when ditridecyl phthalate or triisodecyl trimellitate were used at the concentrations stated, the powder coatings did not cake and the films produced had good impact properties. If the concentration varied from that stated, the films did not have the desired impact properties. This is shown in the following examples.

Example 1

A formulation was prepared of:

- 100 parts of an 84/15/1 vinyl chloride/vinyl acetate/maleic acid terpolymer
- 25 parts of ditridecyl phthalate
- 65 parts of titanium dioxide
- 5 parts of the bis-glycidyl ether of bisphenol-A
- 2 parts of Thermolite T-31.

In this formulation the proportion of terpolymer to plasticizer was 80:20. The mixture was fused, diced and ground in a cryogenic grinder at −175° C. to −200° C. using liquid nitrogen for cooling. The powder was dried overnight in a vacuum dessicator and passed through a 70 mesh screen. The powder was electrostatically spray coated on to steel panels and cured to a uniform film by baking at 400° F. for 5 minutes. This powder composition remained free flowing even after standing for several weeks. The cured film had a Gardner reverse impact value of greater than 80 inch pounds.

For comparative purposes two formulations were prepared in the proportions of resin to ditridecyl phthalate of 90:10 and 85:15. Both comparative formulations remained free flowing, however, the Gardner reverse impact values were very poor; less than 10 inch pounds and less than 20 inch pounds, respectively. The low impact values show unsatisfactory adhesion of the formulation to the metal substrate rendering the composition commercially unsuitable.

Example 2

A powder was produced using the same 80:20 ratio in the formulation and the same conditions described in Example 1 but substituting triisodecyl trimellitate for the ditridecyl phthalate plasticizer. The powder composition was free flowing and the cured film had a Gardner reverse impact value of greater than 80 inch pounds.

What is claimed is:

1. A free flowing powder comprising from 75 to 82 parts by weight of a vinyl chloride/vinyl acetate/maleic acid terpolymer and from 18 to 25 parts by weight of a plasticizer ditridecyl phthalate, triisodecyl trimellitate, or mixtures thereof, the monomers being present in said terpolymer in amounts of about from 78 to 88/11 to 19/0.1 to 3 weight percent respectively.

2. A free flowing powder as claimed in claim 1 comprising from 79 to 81 parts by weight of said terpolymer and from 19 to 21 parts by weight of said plasticizer.

3. A free flowing powder as claimed in claim 1 wherein the monomers are present in said terpolymer in amounts of from 80 to 85 weight percent vinyl chloride, from 14 to 18 weight percent vinyl acetate and from 1 to 2 weight percent maleic acid.

4. A free flowing powder as claimed in claim 2 wherein the monomers are present in said terpolymer in amounts of from 80 to 85 weight percent vinyl chloride, from 14 to 18 weight percent vinyl acetate and from 1 to 2 weight percent maleic acid.

References Cited

UNITED STATES PATENTS

| | | | |
|---|---|---|---|
| 3,635,928 | 1/1972 | Thomas | 260—92.8 A |
| 3,057,831 | 10/1962 | Holdsworth | 260—87.1 |
| 3,706,705 | 12/1972 | Koyangi et al. | 260—87.1 |
| 3,280,063 | 10/1966 | Zawadski et al. | 260—31.8 B |
| 3,444,237 | 5/1969 | Jaffe | 260—31.8 B |

OTHER REFERENCES

Chemical Abstracts, volume 56, 10389d, 1962.

MORRIS LIEBMAN, Primary Examiner

S. L. FOX, Assistant Examiner

U.S. Cl. X.R.

260—31.8 B, 31.8 W